(12) United States Patent
Jen et al.

(10) Patent No.: US 11,094,936 B2
(45) Date of Patent: Aug. 17, 2021

(54) TUNGSTEN-DOPED LITHIUM MANGANESE IRON PHOSPHATE-BASED PARTICULATE, TUNGSTEN-DOPED LITHIUM MANGANESE IRON PHOSPHATE-BASED POWDERY MATERIAL INCLUDING THE SAME, AND METHOD FOR PREPARING POWDERY MATERIAL

(71) Applicant: HCM CO., LTD., Taoyuan (TW)

(72) Inventors: Chien-Wen Jen, New Taipei (TW); Hsin-Ta Huang, Taipei (TW); Chih-Tsung Hsu, New Taipei (TW); Yi-Hsuan Wang, New Taipei (TW)

(73) Assignee: HCM CO., LTD., Taoyuan (TW)

( * ) Notice: Subject to any disclaimer, the term of this patent is extended or adjusted under 35 U.S.C. 154(b) by 0 days.

(21) Appl. No.: 16/717,180

(22) Filed: Dec. 17, 2019

(65) Prior Publication Data

US 2021/0119212 A1    Apr. 22, 2021

(30) Foreign Application Priority Data

Oct. 16, 2019  (TW) .................. 108137209
Oct. 16, 2019  (TW) .................. 108137210

(51) Int. Cl.

| | |
|---|---|
| *H01M 4/58* | (2010.01) |
| *H01M 10/0525* | (2010.01) |
| *H01M 4/587* | (2010.01) |
| *H01M 4/36* | (2006.01) |
| *C01B 25/45* | (2006.01) |
| *H01M 4/02* | (2006.01) |

(52) U.S. Cl.
CPC .......... *H01M 4/5825* (2013.01); *C01B 25/45* (2013.01); *H01M 4/364* (2013.01); *H01M 4/587* (2013.01); *H01M 10/0525* (2013.01); *C01P 2002/74* (2013.01); *C01P 2006/12* (2013.01); *C01P 2006/40* (2013.01); *H01M 2004/021* (2013.01); *H01M 2004/028* (2013.01)

(58) Field of Classification Search
CPC .............. H01M 4/5825; H01M 4/364; H01M 10/0525; H01M 2004/028; C01B 25/45
USPC .................... 252/513, 515, 521.2, 521.6
See application file for complete search history.

(56) References Cited

U.S. PATENT DOCUMENTS

| | | |
|---|---|---|
| 2012/0326079 A1 | 12/2012 | Kim et al. |
| 2013/0140497 A1 | 6/2013 | Nuspl et al. |
| 2016/0240856 A1* | 8/2016 | Paulsen ................. H01M 4/625 |

FOREIGN PATENT DOCUMENTS

| | | |
|---|---|---|
| CN | 106935851 A | 7/2017 |
| EP | 2407422 A1 | 1/2012 |

OTHER PUBLICATIONS

Hongfei Liu and Tiekun Jia "Electrochemical Properties of W doped LiFePO4/C Prepared by Solid-state Synthesis", Journal of Ningxia University vol. 32 No. 2, Jun. 2011, pp. 144-146.
Search Report appended to an Office Action, which was issued to Taiwanese counterpart application No. 108137209 by the TIPO dated Jun. 4, 2020, with an English translation thereof.
Richard Prabakar S J et al.: "W-doped LiWx Ni0.5 Mn1.5-X O4 cathodes for the improvement of high rate performances in Li ion batteries", Journal of Power Sources 209(2012), pp. 57-64.
Search Report issued to European counterpart application No. 20150984.1 by the EPO dated Apr. 22, 2020.

* cited by examiner

*Primary Examiner* — Tri V Nguyen
(74) *Attorney, Agent, or Firm* — MLO, a professional corp.

(57) ABSTRACT

Disclosed is a tungsten-doped lithium manganese iron phosphate-based particulate for a cathode of a lithium-ion battery. The particulates include a composition represented by a formula $Li_xMn_{1-y-z-f}Fe_yM_zW_fP_aO_{4a \pm p}C$, wherein x, y, z, f, a, p, and M are as defined herein. Also disclosed is a powdery material including the particulates, and a method for preparing the powdery material.

6 Claims, 3 Drawing Sheets

TUNGSTEN-DOPED LITHIUM MANGANESE IRON PHOSPHATE-BASED PARTICULATE, TUNGSTEN-DOPED LITHIUM MANGANESE IRON PHOSPHATE-BASED POWDERY MATERIAL INCLUDING THE SAME, AND METHOD FOR PREPARING POWDERY MATERIAL

CROSS-REFERENCE TO RELATED APPLICATION

This patent application claims priority of Taiwanese Patent Application Nos. 108137209 and 108137210, both of which were filed on Oct. 16, 2019.

FIELD

The disclosure relates to a tungsten-doped lithium manganese iron phosphate-based particulate, and more particularly to a tungsten-doped lithium manganese iron phosphate-based particulate for a cathode of a lithium-ion battery. The disclosure also relates to a tungsten-doped lithium manganese iron phosphate-based powdery material including the particulate, and a method for preparing the powdery material.

BACKGROUND

Lithium-ion battery is commonly used as an energy saving device and a power supplying device for consumer electronic products, transportation facilities, etc. Conventional lithium manganese iron phosphate suitably used as a cathode of the lithium-ion battery has inferior electric conductivity, and thus is usually doped with a metal element without electrochemical activity so as to enhance the electric conductivity thereof.

However, the doped lithium manganese iron phosphate usually has a relatively low electric capacity, compared to undoped lithium manganese iron phosphate. Therefore, the energy density of the lithium-ion battery thus made is undesirably reduced. In addition, the doped lithium manganese iron phosphate usually has a relatively large specific surface area, compared to the undoped lithium manganese iron phosphate, and thus is liable to absorb moisture. Therefore, a cathode material containing the doped lithium manganese iron phosphate is difficult to be dispersed, resulting in increased production cost for an electrode made therefrom, which is one or the reasons why the lithium-ion battery that uses the doped lithium manganese iron phosphate as a cathode material remains to be commercialized.

SUMMARY

Therefore, a first object of the disclosure is to provide a tungsten-doped lithium manganese iron phosphate-based particulate for a cathode of a lithium-ion battery to overcome the shortcomings described above.

A second object of the disclosure is to provide a tungsten-doped lithium manganese iron phosphate-based powdery material, which includes the tungsten-doped lithium manganese iron phosphate-based particulate, for a cathode of a lithium-ion battery.

A third object of the disclosure is to provide a method for preparing the tungsten-doped lithium manganese iron phosphate-based powdery material.

According to a first aspect of the disclosure, there is provided a tungsten-doped lithium manganese iron phosphate-based particulate for a cathode of a lithium-ion battery. The tungsten-doped lithium manganese iron phosphate-based particulate includes a composition represented by Formula (1):

$$Li_xMn_{1-y-z-f}Fe_yM_zW_fP_aO_{4\pm p}/C \qquad (1)$$

wherein
M is selected from the group consisting of Mg, Ca, Sr, Al, Si, Ti, Cr, V, Co, Ni, Zn, and combinations thereof;
$0.9 \leq x \leq 1.2$;
$0.1 \leq y \leq 0.4$;
$0 \leq z \leq 0.08$;
$0 < f < 0.02$;
$0.1 < y+z+f < 0.5$;
$0.85 \leq a \leq 1.15$;
$0 < p < 0.1$; and
C is in an amount of larger than 0 wt % and up to 3.0 wt % based on a total weight of the composition represented by Formula (1).

According to a second aspect of the disclosure, there is provided a tungsten-doped lithium manganese iron phosphate-based powdery material for a cathode of a lithium-ion battery. The tungsten-doped lithium manganese iron phosphate-based powdery material includes the tungsten-doped lithium manganese iron phosphate-based particulate.

According to a third aspect of the disclosure, there is provided a method for preparing the tungsten-doped manganese iron phosphate-based powdery material. The method includes the steps of:

a) preparing a blend which includes a lithium source, a manganese source, a tungsten source, an iron source, a phosphorous source, and a source of an additional metal selected from the group consisting of Mg, Ca, Sr, Al, Si, Ti, Cr, V, Co, Ni, Zn, and combinations thereof;

b) adding a carbon source to the blend to form a mixture and subjecting the mixture to milling and granulating to form a granulated mixture; and c) subjecting the granulated mixture to a sintering treatment to form the tungsten-doped lithium manganese iron phosphate-based powdery material.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
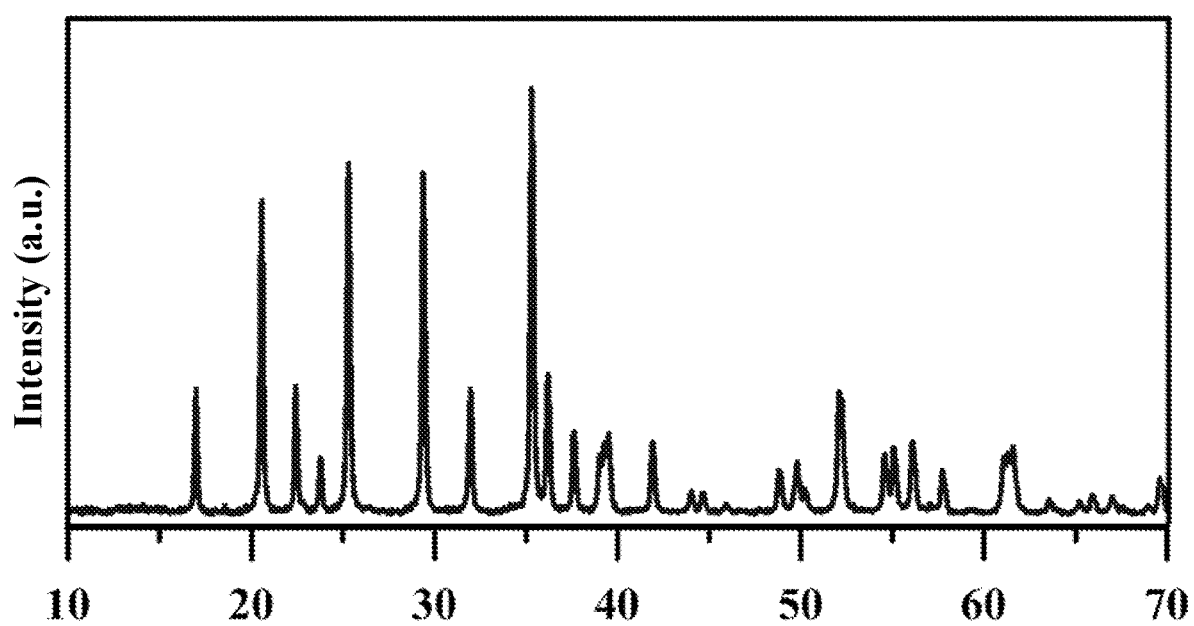
FIG. 1 is a graph illustrating x-ray diffraction analysis result of a tungsten-doped lithium manganese iron phosphate-based particulate of Example 1.

A tungsten-doped lithium manganese iron phosphate-based particulate for a cathode of a lithium-ion battery according to the disclosure includes a composition represented by Formula (1):

$$Li_xMn_{1-y-z-f}Fe_yM_zW_fP_aO_{4\pm p}/C \qquad (1)$$

wherein

M is selected from the group consisting of Mg, Ca, Sr, Al, Si, Ti, Cr, V, Co, Ni, Zn, and combinations thereof;

$0.9 \leq x \leq 1.2$;
$0.1 \leq y \leq 0.4$;
$0 \leq z \leq 0.08$;
$0 < f < 0.02$;
$0.1 < y+z+f < 0.5$;
$0.85 \leq a \leq 1.15$;
$0 < p < 0.1$; and C (i.e., carbon) is in an amount of larger than 0 wt % and up to 3.0 wt % based on a total weight of the composition represented by Formula (1).

In certain embodiments, M is Mg (i.e., magnesium).

In certain embodiments, f is larger than 0 and less than 0.01 (i.e., $0 < f < 0.01$).

A tungsten-doped lithium manganese iron phosphate-based powdery material for a cathode of a lithium-ion battery according to the disclosure includes the tungsten-doped lithium manganese iron phosphate-based particulate described above.

In certain embodiments, the tungsten-doped lithium manganese iron phosphate-based powdery material has a specific surface area ranging from 0.5 m²/g to 20 m²/g.

A method for preparing the tungsten-doped lithium manganese iron phosphate-based powdery material according to the disclosure includes the steps of:

a) preparing a blend which includes a lithium source, a manganese source, a tungsten source, an iron source, a phosphorous source, and a source of an additional metal selected from the group consisting of Mg, Ca, Sr, Al, Si, Ti, Cr, V, Co, Ni, Zn, and combinations thereof;

b) adding a carbon source to the blend to form a mixture and subjecting the mixture to milling and granulating to form a granulated mixture; and c) subjecting the granulated mixture to a sintering treatment to form the tungsten-doped lithium manganese iron phosphate-based powdery material.

In certain embodiments, the tungsten source used in step a) is tungsten trioxide.

In certain embodiments, the source of the additional metal used in step a) is a magnesium-containing compound (i.e., the additional metal is Mg). In the examples illustrated below, the source of the additional metal used in step a) is magnesium oxide.

In certain embodiments, the sintering treatment in step c) is implemented at a temperature ranging from 500° C. to 950° C.

Examples of the disclosure will be described hereinafter. It is to be understood that these examples are exemplary and explanatory and should not be construed as a limitation to the disclosure.

Example 1: Preparation of a Powdery Material Including Tungsten-Doped Lithium Manganese Iron Phosphate-Based Particulates of $Li_{1.02}Mn_{0.72}Fe_{0.23}Mg_{0.048}W_{0.002}PO_{4a\pm p}/C$ ($P_{E1}$)

Manganese oxalate (a source of manganese (Mn)), iron oxalate (a source of iron (Fe)), magnesium oxide (a source of magnesium (Mg)), tungsten trioxide (a source of tungsten (W)), and phosphoric acid (a source of phosphorus (P)) in a molar ratio of Mn:Fe:Mg:W:P of 0.720:0.230:0.048:0.002:1.000 were added sequentially into a reactor, and were stirred with water for 1.5 hours, followed by blending with lithium hydroxide (a source of lithium, a molar ratio of Li:P is 1.02:1.00) to obtain a blend. Thereafter, the blend was mixed with a combination of citric acid and glucose (a source of carbon, a molar ratio of C:P is 0.092:1.00) to obtain a mixture. The mixture was ground in a ball mill for 4 hours, and was then granulated and dried using a spray granulator to obtain a granulated mixture. The granulated mixture was subjected a sintering treatment under a nitrogen atmosphere at 450° C. for 2 hours and then at 750° C. for 4 hours to obtain a target powdery mater al including tungsten-doped lithium manganese iron phosphate-based particulates of $Li_{1.02}Mn_{0.72}Fe_{0.23}Mg_{0.048}W_{0.002}PO_{4a\pm p}/C$. An amount of carbon in the tungsten-doped lithium manganese iron phosphate-based particulates is 1.53 wt % based on a total weight of the tungsten-doped lithium manganese iron phosphate-based particulates.

Comparative Example 1: Preparation of a Powdery Material Including Lithium Manganese Iron Phosphate-Based Particulates of $Li_{1.02}Mn_{0.72}Fe_{0.23}Mg_{0.05}PO_4/C$ ($P_{CE1}$)

Procedures of Comparative Example 1 were similar to those of Example 1 except that magnesium oxide, tungsten trioxide, and phosphoric acid were used in a molar ratio of Mg:W:P of 0.050:0:1.000 in Comparative Example 1.

Comparative Example 2: Preparation of a Powdery Material Including Tungsten-Doped Lithium Manganese Iron Phosphate-Based Particulates of $Li_{1.02}Mn_{0.72}Fe_{0.23}Mg_{0.03}W_{0.02}PO_{4a\pm p}/C$ ($P_{CE2}$)

Procedures of Comparative Example 2 were similar to those of Example 1 except that magnesium oxide, tungsten trioxide, and phosphoric acid were used in a molar ratio of Mg:W:P of 0.030:0.020:1.000 in Comparative Example 2.

X-Ray Diffraction (XRD) Analysis:

The powder material of Example 1 was analyzed using an X-ray diffractometer. The analysis result is shown in FIG. 1.

As shown in FIG. 1, the tungsten-doped lithium manganese iron phosphate-based particulates contained in the powdery material of Example 1 have an olivine-type crystal structure.

Measurement of Specific Surface Area:

The specific surface area of each of the powdery materials of Example 1 and Comparative Examples 1 and 2 was measured by a BET (Brunauer-Emmett-Teller) method using a specific surface area analyzer. The results are shown in Table 1 below.

TABLE 1

| Powdery materials | Surface specific area (m²/g) |
|---|---|
| $P_{E1}$ | 13.1 |
| $P_{CE1}$ | 18.5 |
| $P_{CE2}$ | 15.7 |

As shown in Table 1, the powdery material of Example has a relatively small specific surface area, compared to those of Comparative Examples 1 and 2, and thus has a better resistance to moisture absorption and can be further processed more conveniently in a process for manufacturing a lithium-ion battery. Contrarily, the powdery material of Comparative Example 1, in which the lithium manganese iron phosphate-based particulates were not doped with tungsten, and the powdery material of Comparative Example 2, in which the lithium manganese iron phosphate-based particulates were doped with tungsten in a relatively large amount, have relatively large specific surface areas, and thus will be affected severely by an electrolyte solution when lithium-ion batteries are manufactured therefrom.

Application Example 1

The powdery material of Example 1, carbon black, and polyvinylidene fluoride were blended at a weight ratio of 93:3:4 to obtain a blend. The blend was mixed with N-methyl-2-pyrrolidone to obtain a paste, which was applied using a doctor blade onto an aluminum foil having a thickness of 20 μm, followed by baking in vacuum at 140° C. to remove N-methyl-2-pyrrolidone, thereby obtaining a cathode material. The cathode material was pressed using a roller_ to a thickness of 75 μm and cut into a circular cathode with a diameter of 12 mm.

A lithium foil was used to make an anode with a diameter of 15 mm and a thickness of 0.2 mm. Lithium hexafluorophosphate (LiPF$_6$, 1 M) was dissolved in a solvent system composed of ethylene carbonate, ethylmethyl carbonate, and dimethyl carbonate in a volume ratio of 1:1:1 to obtain an electrolyte solution.

A polypropylene membrane (purchased from Asahi Kasei Corp., a thickness of 25 μm) was cut into a circular separator with a diameter of 18 mm. The circular separator was immersed into the electrolyte solution and then removed therefrom to obtain an immersed separator.

The cathode, the anode, and the immersed separator thus prepared were used along with other components to manufacture a CR2032 coin-type lithium-ion battery.

Comparative Application Example 1

The procedures of Comparative Application Example 1 were similar to those of Application Example 1 except that the powdery material of Comparative Example 1 was used to make a circular cathode in Comparative Application Example 1.

Comparative Application Example 2

The procedures of Comparative Application Example 2 were similar to those of Application Example 1 except that the powdery material of Comparative Example 2 was used to make a circular cathode in Comparative Application Example 2.

Charge/Discharge Capacity Measurement:

Charge/discharge specific capacity of each of the lithium-ion batteries of Application Example 1 and Comparative Application Examples 1 and 2 was measured at 25° C. using a battery test device (commercially available from MACCOR, USA) at a current level of 1 C/0.1 C and at a voltage ranging from 2.7 V to 4.25 V. The results are shown in FIG. 2.

Figure 2:
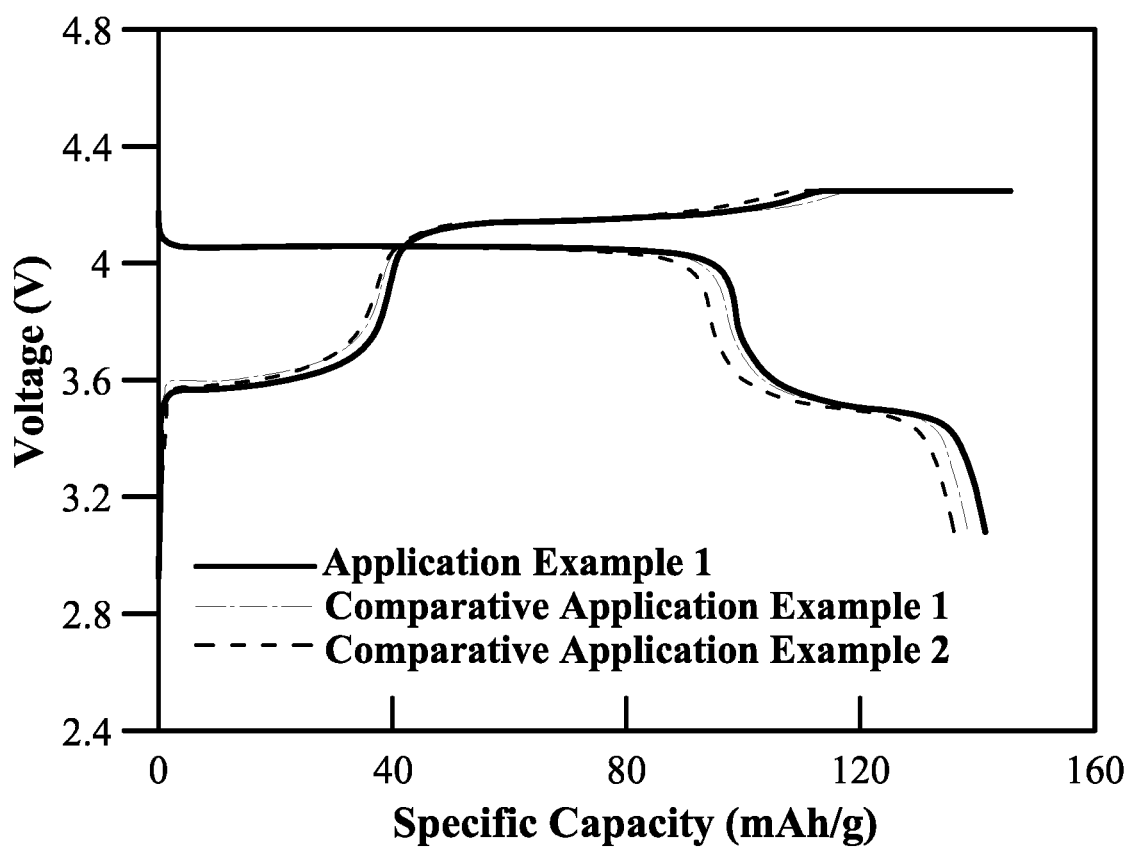
FIG. 2 is a graph illustrating charge/discharge specific capacity-voltage relationships of lithium-ion batteries of Application Example 1 and Comparative Application Examples 1 and 2.

As shown in FIG. 2, the lithium-ion battery of Application Example 1 has a discharge specific capacity of 144.5 mAh/g. The lithium-ion batteries of Comparative Application Examples 1 and 2 respectively have discharge specific capacities of 141.9 mAh/g and 139.2 mAh/g, which are lower than that (144.5 mAh/g) of the lithium-ion battery of Application Example 1

Cycle Charge/Discharge Measurement:

Each of the lithium-ion batteries of Application Example 1 and Comparative Application Examples 1 and 2 was measured at 25° C. using a battery test device (commercially available from MACCOR, USA) at currents of 1 C/0.1 C, 1 C/1 C, 1 C/5 C, and 1 C/10 C in sequence, and at a voltage ranging from 2.7 V to 4.25 V for 3 charge/discharge cycles for each of the currents. The results are shown in FIG. 3.

Figure 3:
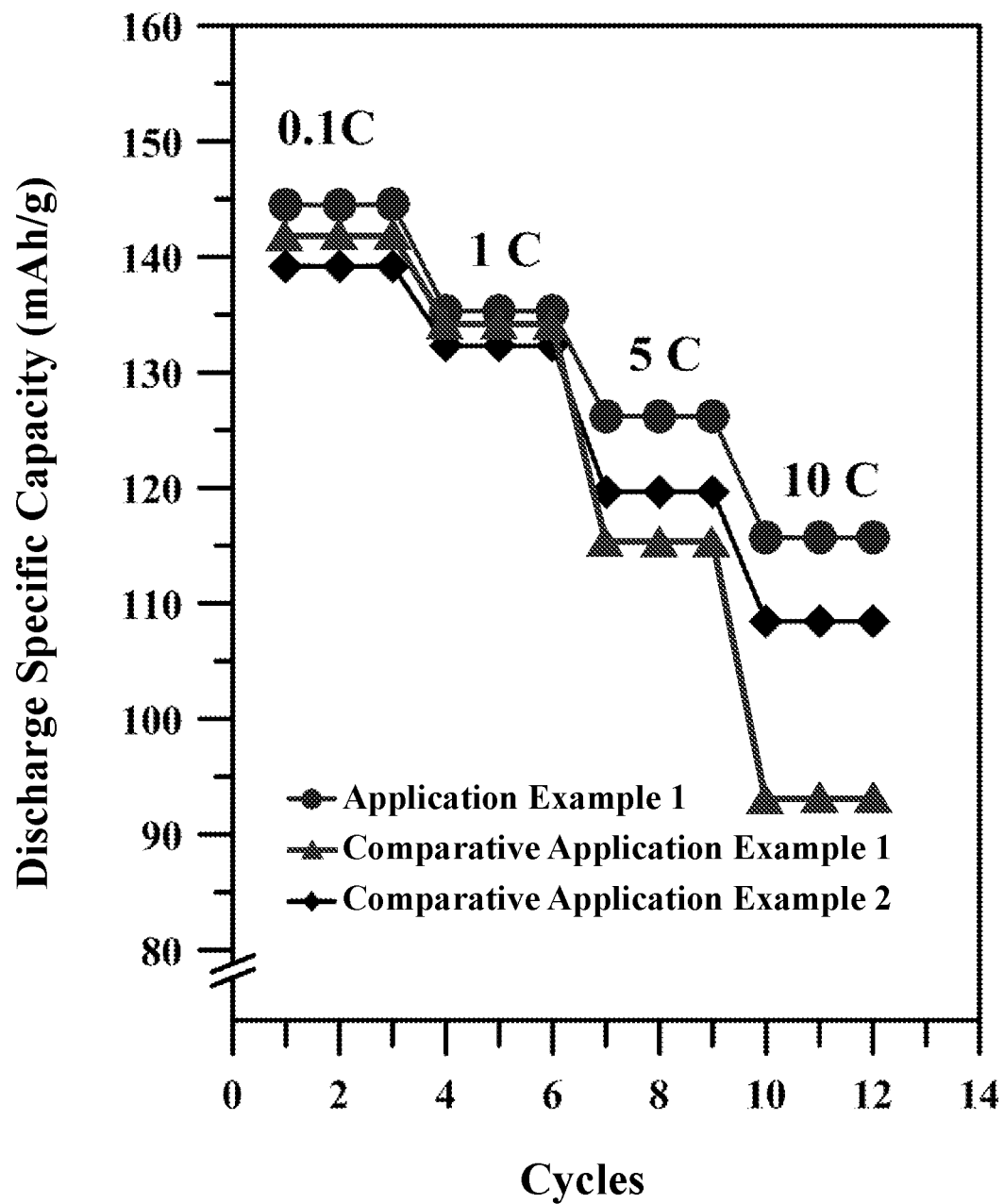
FIG. 3 is a graph illustrating cycle number-discharge specific capacity relationships of the lithium-ion batteries of Application Example 1 and Comparative Application Examples 1 and 2 at various charge/discharge rates.

From the results shown in FIG. 3, a discharge specific capacity maintenance ratio at a discharge current of 10 C is calculated by dividing the discharge specific capacity at the first charge/discharge cycle at a discharge current of 10 C by the discharge specific capacity at the first charge/discharge cycle at a discharge current of 0.1. At a discharge current of 10 C, the discharge specific capacity maintenance ratio of the lithium-ion battery of Application Example 1 is 80.0%, and the discharge specific capacity maintenance ratios of the lithium-ion batteries of Comparative Application Examples 1 and 2 are respectively 65.6% and 77.9%, which are lower than that (80.0%) of the lithium-ion battery of Application Example 1.

In view of the aforesaid, the powdery material including the tungsten-doped lithium manganese iron phosphate-based particulates of the disclosure has a relatively small specific surface area. The lithium-ion battery manufactured using the powdery material has a relatively large discharge specific capacity and a relatively high specific capacity maintenance ratio at a large discharge current.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:
1. A tungsten-doped lithium manganese iron phosphate-based particulate for a cathode of a lithium-ion battery, comprising a composition represented by Formula (1):

$$Li_xMn_{1-y-z-f}Fe_yM_zW_fP_aO_{4a+p}/C \qquad (1)$$

wherein
M is Mg;
0.9≤x≤1.2;
0.1≤y≤0.4;
0≤z≤0.08;
f=0.002;
0.1<y+z+f<0.5;
0.85≤a≤1.15;
0<p<0.1; and
C is in an amount of larger than 0 wt % and up to 3.0 wt % based on a total weight of the composition represented by Formula (1).

2. A tungsten-doped lithium manganese iron phosphate-based powdery material for a cathode of a lithium-ion battery, comprising the tungsten-doped lithium manganese iron phosphate-based particulate according to claim 1.

3. The tungsten-doped lithium manganese iron phosphate-based powdery material according to claim 2, having a specific surface area ranging from 0.5 m²/g to 20 m²/g.

4. A method for preparing the tungsten-doped lithium manganese iron phosphate-based powdery material according to claim 2, comprising the steps of:
   a) preparing a blend which includes a lithium source, a manganese source, a tungsten source, an iron source, a phosphorous source, and a magnesium source;
   b) adding a carbon source to the blend to form a mixture and subjecting the mixture to milling and granulating to form a granulated mixture; and
   c) subjecting the granulated mixture to a sintering treatment to form the tungsten-doped lithium manganese iron phosphate-based powdery material.

5. The method according to claim 4, wherein in step a), the tungsten source is tungsten trioxide.

6. The method according to claim 4, wherein in step c), the sintering treatment is implemented at a temperature ranging from 500° C. to 950° C.

* * * * *